US010410661B1

(12) United States Patent
Mendonsa et al.

(10) Patent No.: US 10,410,661 B1
(45) Date of Patent: Sep. 10, 2019

(54) HEAD MEDIA SPACING USING MULTIPLE READERS

(71) Applicant: Seagate Technology LLC, Cupertino, CA (US)

(72) Inventors: Riyan Alex Mendonsa, Edina, MN (US); Walter R Eppler, Cranberry Township, PA (US); Puskal P Pokharel, Edina, MN (US); Gary Ernest Hillukka, Cokato, MN (US); Stephanie Hernandez, Plymouth, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 16/172,141

(22) Filed: Oct. 26, 2018

(51) Int. Cl.
G11B 5/54 (2006.01)
G11B 5/60 (2006.01)

(52) U.S. Cl.
CPC .................. *G11B 5/6029* (2013.01)

(58) Field of Classification Search
CPC .............. G11B 5/00; G11B 27/36; G11B 5/54
USPC .............................. 360/31, 55, 75
See application file for complete search history.

(56) References Cited

U.S. PATENT DOCUMENTS

| | | |
|---|---|---|
| 5,995,340 A | 11/1999 | Ha |
| 6,437,930 B1 * | 8/2002 | Liu ..................... G11B 5/6005 360/25 |
| 6,525,893 B1 | 2/2003 | Richter et al. |
| 7,038,875 B2 | 5/2006 | Lou et al. |
| 7,808,734 B2 | 10/2010 | Eaton et al. |
| 8,730,612 B1 | 5/2014 | Haralson |
| 8,902,718 B1 | 12/2014 | Ruan et al. |
| 9,001,451 B1 | 4/2015 | Martin et al. |
| 9,202,495 B2 | 12/2015 | Liu et al. |
| 9,484,052 B1 | 11/2016 | Johnson et al. |
| 9,595,279 B1 | 3/2017 | Martin |
| 9,786,310 B1 | 10/2017 | Richter et al. |

* cited by examiner

*Primary Examiner* — Nabil Z Hindi
(74) *Attorney, Agent, or Firm* — Faegre Baker Daniels LLP

(57) ABSTRACT

A hard disc drive includes a slider including a first reader and a second reader. The hard disc drive also includes a magnetic recording medium and a controller. The controller is configured to determine a distance between the slider and the magnetic recording medium based at least in part on amplitudes of read signals from both the first reader and the second reader.

20 Claims, 6 Drawing Sheets

HEAD MEDIA SPACING USING MULTIPLE READERS

SUMMARY

In certain embodiments, a hard disc drive includes a slider with a first reader and a second reader. The hard disc drive also includes a magnetic recording medium and a controller. The controller is configured to determine a distance between the slider and the magnetic recording medium based at least in part on amplitudes of read signals from both the first reader and the second reader.

In certain embodiments, a method includes receiving a first signal having a first amplitude from a first reader of a slider; receiving a second signal having a second amplitude from a second reader of the slider; and determining a head-to-media spacing based at least in part on the first amplitude and the second amplitude.

In certain embodiments, an integrated circuit includes means for determining a ratio between amplitudes of the read signals from both a first reader and a second reader. The integrated circuit further includes means for determining a head-to-media spacing based at least in part on the determined ratio.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
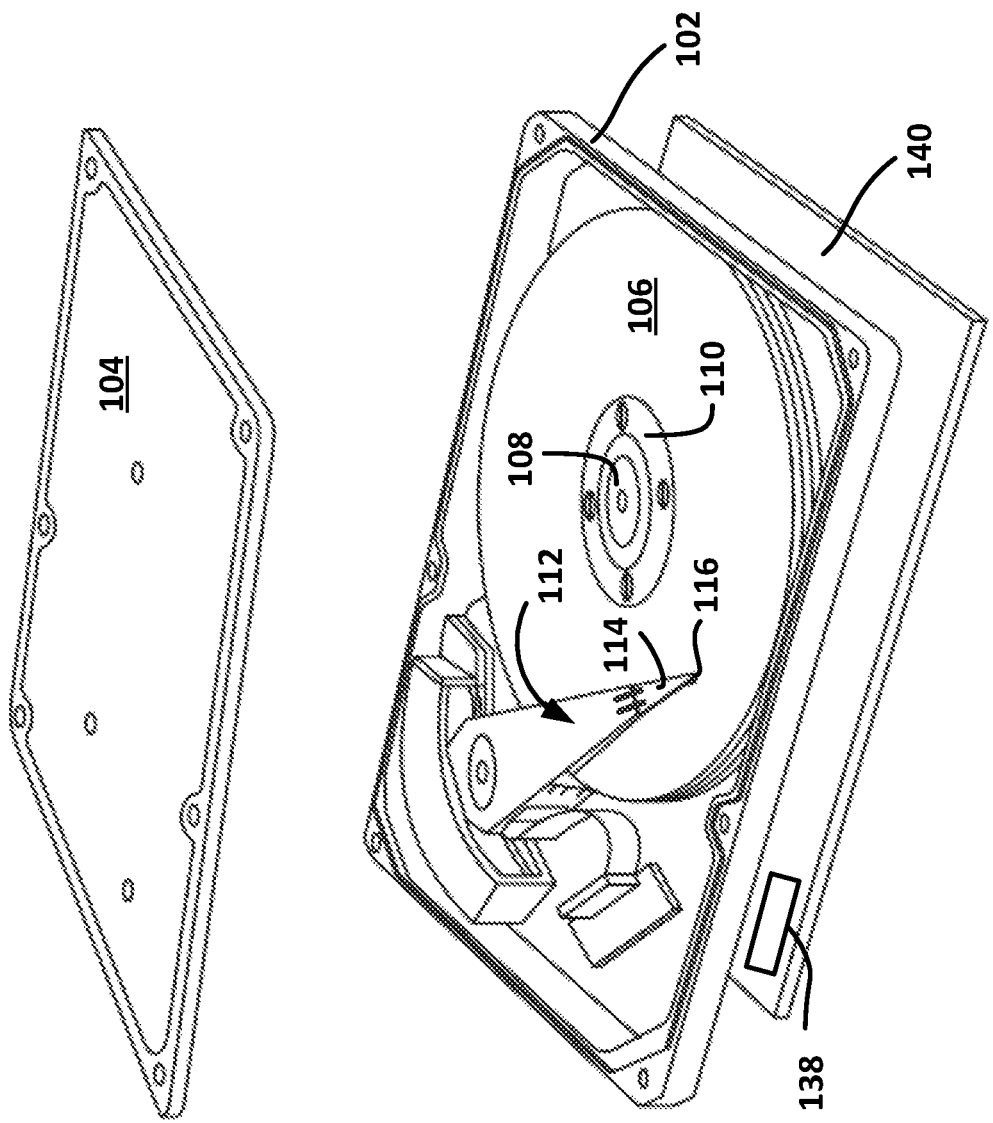
FIG. 1 shows an exploded, perspective view of a hard disc drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims

DETAILED DESCRIPTION

Certain embodiments of the present disclosure relate to measuring and adjusting head-to-media spacing in hard disc drives.

FIG. 1 shows an exploded, perspective view of a hard disc drive 100 having a base deck 102 and top cover 104. The hard disc drive 100 includes magnetic recording media 106 coupled to a spindle motor 108 by a disc clamp 110. The hard disc drive 100 also includes an actuator assembly 112 coupled to a suspension assembly 114 that suspends a slider 116 over the disc-shaped magnetic recording media 106. The hard disc drive 100 can include multiple sliders 116, e.g., a slider 116 positioned on each side of each disc of the magnetic recording media 106.

Figure 2:
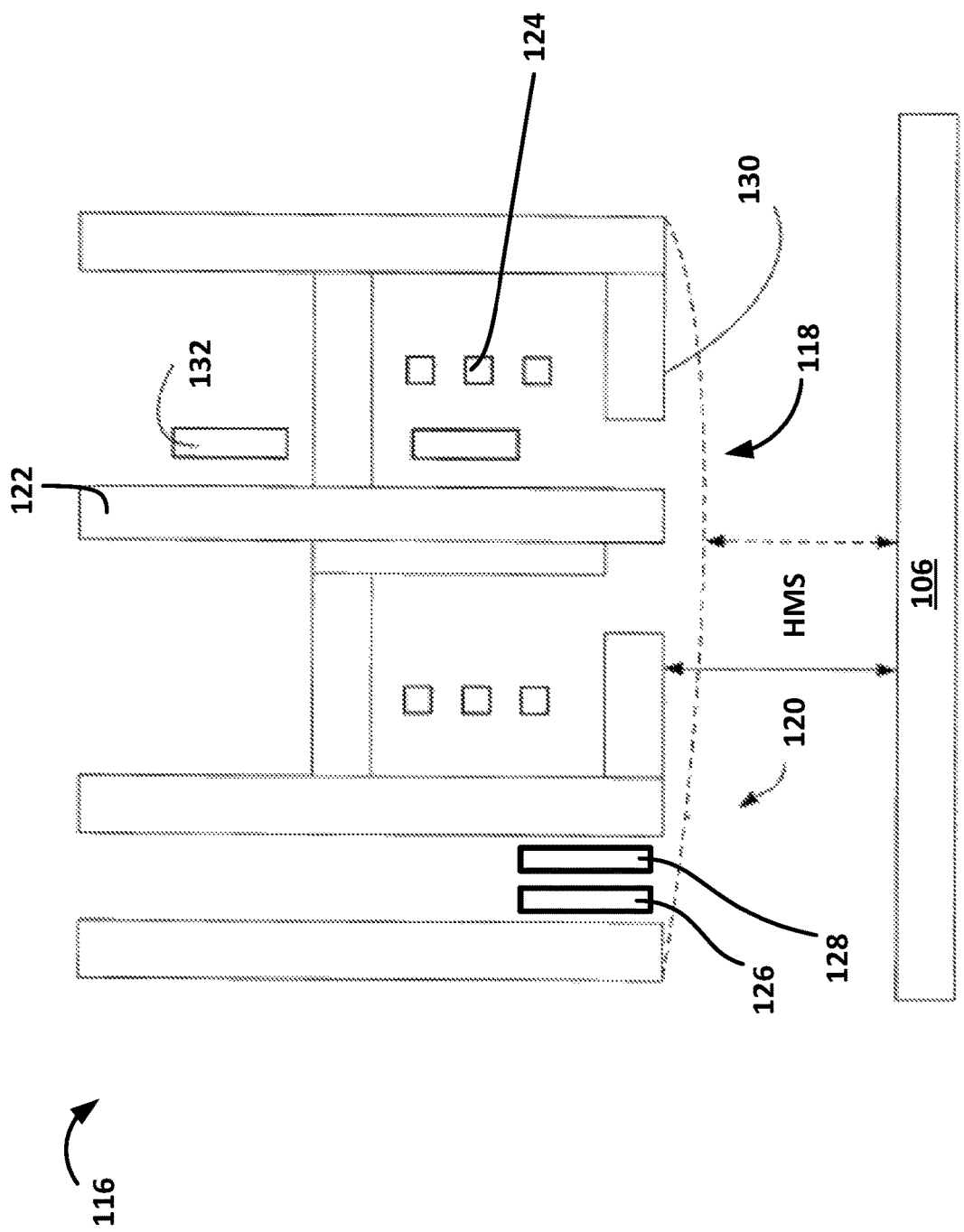
FIG. 2 shows a schematic partial, cut-away, side view of a slider of the hard disc drive of FIG. 1, in accordance with certain embodiments of the present disclosure.

FIG. 2 shows the slider 116 having a writer portion 118 and a reader portion 120. The writer portion 118 includes a writer 122 and a coil 124 or set of coils positioned around and/or near the writer 122. In operation, current is applied to the coils 124, which induces a magnetic field in the writer 122. The writer 122 emits a magnetic field towards the magnetic recording media 106 which induces magnetically polarized transitions on a desired data track of the magnetic recording media 106. The magnetically polarized transitions are representative of data.

The reader portion 120 includes at least two readers (e.g., a first reader 126 and a second reader 128) each of which sense (or "read") the magnetically polarized transitions written to the magnetic recording media 106. As one of the discs of the magnetic recording media 106 rotates adjacent the first reader 126 and the second reader 128, the magnetically polarized transitions induce a varying magnetic field into the readers. As will be described in more detail below, the first reader 126 and the second reader 128 convert the varying magnetic field into respective read signals that are delivered to a preamplifier and then to a read channel for processing. The read channel converts the read signal(s) into one or more digital signals that are processed and then provided to a host system (e.g., server, laptop computer, desktop computer).

In operation, the slider 116 "flies" over one of the discs of the magnetic recording media 106 as shown in FIG. 2. The distance between the slider 116 (e.g., the air-bearing surface 130 of the slider 116) and a surface of the disc can be referred to as head-to-media spacing or fly height. Head-to-media spacing typically decreases as hard disc drives 100 increase in areal density. That is, as hard disc drives 100 store more data bits per disc, the hard disc drives 100 are typically designed so that the sliders 116 fly closer to the magnetic recording media 106 during operation. Head-to-media spacing varies as hard disc drives 100 operate across a range of environments (e.g., different temperature, humidity, and pressure ranges). When the sliders 116 fly too close to the magnetic recording media 106, the sliders 116 and its components can be damaged from accidental contact with the magnetic recording media 106 and/or particles between the sliders 116 and the magnetic recording media 106. When the sliders 116 fly too high, the reader(s) 126, 128 cannot accurately read data from the magnetic recording media 106 and/or the writer 122 cannot accurately write data to the magnetic recording media 106.

Head-to-media spacing can also be varied by thermal protrusion. FIG. 2 shows the slider 116 having a heating circuit 132. When current is passed through the heating circuit 132, the heating circuit 132 provides localized heat to induce thermal protrusion at the air-bearing surface 130 of the slider 116. An example of thermal protrusion is shown as a dotted line in FIG. 2, protruding towards the magnetic recording media 106. As a result of the protrusion, the head-to-media spacing (HMS) is altered. Thus, the heating circuit 132 can be activated and de-activated to adjust the head-to-media spacing.

Figure 3:
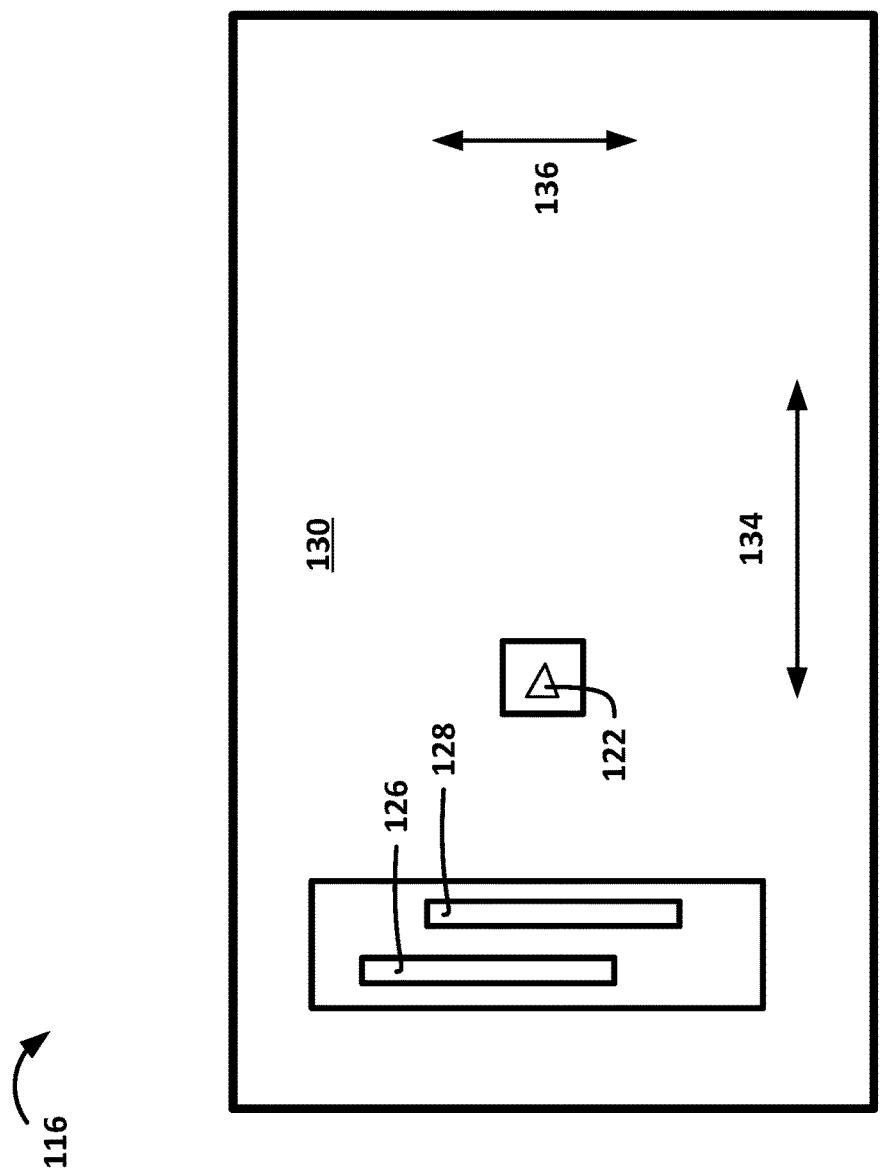
FIG. 3 shows a schematic partial, bottom view of the slider of FIG. 2, in accordance with certain embodiments of the present disclosure.

As shown in FIGS. 2-3, the reader portion 120 can include multiple readers: the first reader 126 and the second reader 128. In certain embodiments, multiple readers are used to sense magnetic fields in one direction, for example, a direction perpendicular to the surface of the magnetic recording media 106. In certain embodiments, the first reader 126 and the second reader 128 are arranged to sense magnetic fields in different directions than each other. In particular, the present disclosure can incorporate a recording scheme referred to as "vector recording" or "quadrature recording." Such a recording scheme involves sensing both perpendicular and in-plane (or longitudinal) magnetic fields. For example, vector recording can sense and utilize two or more orthogonal directions of magnetic fields from the magnetic recording media 106. Additional details of vector recording, such as details of the perpendicular and longitudinal readers, are described in U.S. patent application Ser. No. 16/048,768, filed Jul. 30, 2018, which is hereby incorporated by reference in its entirety.

The first reader 126 and the second reader 128 both have an effective width that spans one or more tracks on the magnetic recording media 106. The first reader 126 is arranged to sense magnetic fields perpendicular to the surface of the magnetic recording media 106, while the second reader 128 is arranged to sense magnetic fields in a plane parallel to the surface of the magnetic recording media 106—such fields can be referred to as in-plane magnetic fields or longitudinal magnetic fields. In other embodiments, the first reader 126 senses longitudinal magnetic fields, and the second reader 128 senses perpendicular magnetic fields. The first reader 126 and the second reader 128 may be placed in any orientation relative to one another in a downtrack direction 134 or a crosstrack direction 136. Although the first reader 126 and the second reader 128 are shown being offset from each other in the crosstrack direction 136, the readers can be aligned in the crosstrack direction 136. Further, the effective widths of the first reader 126 and the second reader 128 may be the same or different and may be smaller or larger than indicated relative to data tracks on the magnetic recording media 106. Further, the size of the first reader 126 and the second reader 128 is exaggerated in the figures.

In response to detecting the magnetic fields, the first reader 126 generates a first read signal and the second reader 128 generates a second read signal. As discussed above, the respective read signals are delivered to a preamplifier and then to a read channel for processing. The preamplifier and/or read channel may send the read signals to a controller 138. The controller 138 can assist in controlling/adjusting the head-to-media spacing.

The controller 138 can be an integrated circuit (see FIG. 1) with at least one processor (e.g., microprocessor) that executes software and/or firmware code stored in memory of the controller 138. The software/firmware code contains instructions that, when executed by the processor, cause the controller 138 to perform the functions and methods described herein and/or shown in the figures. The controller 138 can include one or more application-specific integrated circuits (ASICs), field-programmable gate arrays (FPGAs), digital signal processors (DSPs), or combinations thereof. The controller 138 may be positioned on a printed circuit board 140 (shown in FIG. 1) coupled to the hard disc drive's base deck 102.

One current approach for estimating head-to-media spacing involves use of what is referred to as the Wallace spacing equation. The Wallace spacing equation uses a "harmonic ratio" to estimate head-to-media spacing. This ratio is a ratio of the amplitude of a single reader's read signal at two different harmonics as a result of the single reader reading a "test" pattern recorded to the magnetic recording media 106. This approach requires the reader be positioned over a dedicated portion of a track with the test pattern. As such, the head-to-media spacing may have changed by the time the reader is positioned adjacent to a track with desired user data from the track with the test pattern. Further, test patterns may use space on the magnetic recording media 106 that otherwise could be used to store user data, thus decreasing overall user data storage capacity of the magnetic recording media 106. Further yet, single-reader head-to-media spacing estimates can be distorted by noise of the reader.

Certain embodiments of the present disclosure describe approaches for on-the-fly head-to-media spacing measurements and adjustments using multiple readers (e.g., the first reader 126 and the second reader 128) and their read signals.

As described above, the first reader 126 is arranged to sense perpendicular magnetic fields, and the second reader 128 is arranged to sense longitudinal magnetic fields, or vice versa. It has been found that readers sensing perpendicular magnetic fields respond differently to changes in head-to-media spacing compared to readers sensing longitudinal magnetic fields. For example, for a given head-to-media spacing, the first reader 126 and the second reader 128 will generate read signals with different amplitudes. The present disclosure utilizes these amplitudes for measuring head-to-media spacing in real-time.

Figure 4:
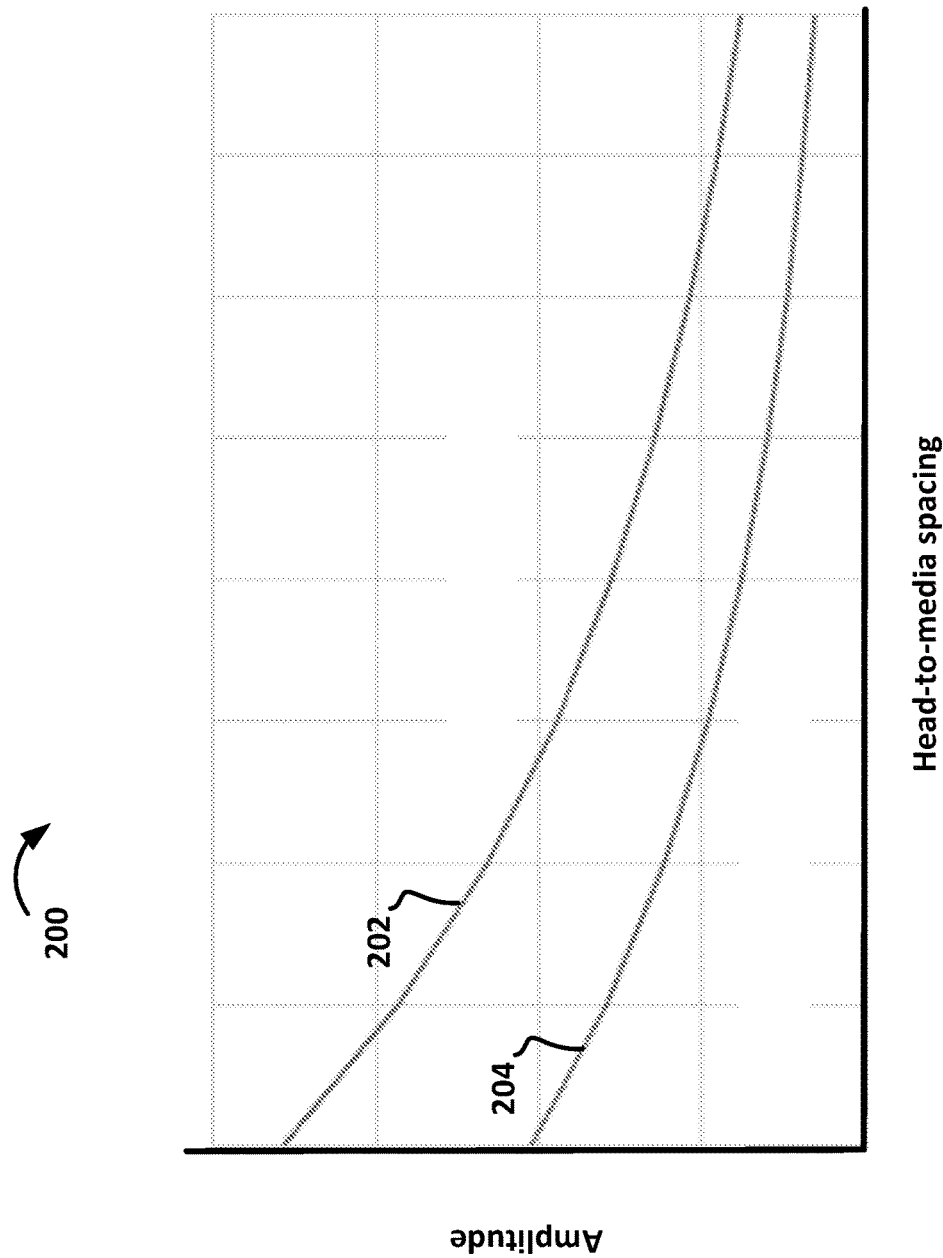
FIG. 4 shows plots of read signal amplitudes as a function of head-to-media spacing, in accordance with certain embodiments of the present disclosure.

FIG. 4 shows a graph 200 with a first plot 202 representing amplitude of a read signal generated by the first reader 126 along different head-to-media spacings. As shown in FIG. 4, the read signal's amplitude is greater the closer the slider 116 is positioned to the magnetic recording media 106 (i.e., greater amplitude at lower head-to-media spacing). The graph 200 also includes a second plot 204 representing amplitude of a read signal generated by the second reader 128 along different head-to-media spacings. Although the first plot 202 appears to be associated with a larger amplitude for a given head-to-media spacing compared to the second plot 204, a reverse relationship between the plots may exist. The different amplitudes may be attributable to the first reader 126 and the second reader 128 having different sensitivity to the magnetic transitions stored on the magnetic recording media 106. For example, the readers may have different magnetic shielding or aspects ratio that cause differences in amplitudes of the respective read signals.

The two different read signals (and their amplitudes) can be used to measure, in real-time, the head-to-media spacing of the slider 116. For example, one of the read signals can be used as a reference to the other read signal, and the relationship between the read signals can be used for measuring head-to-media spacing.

Figure 5:
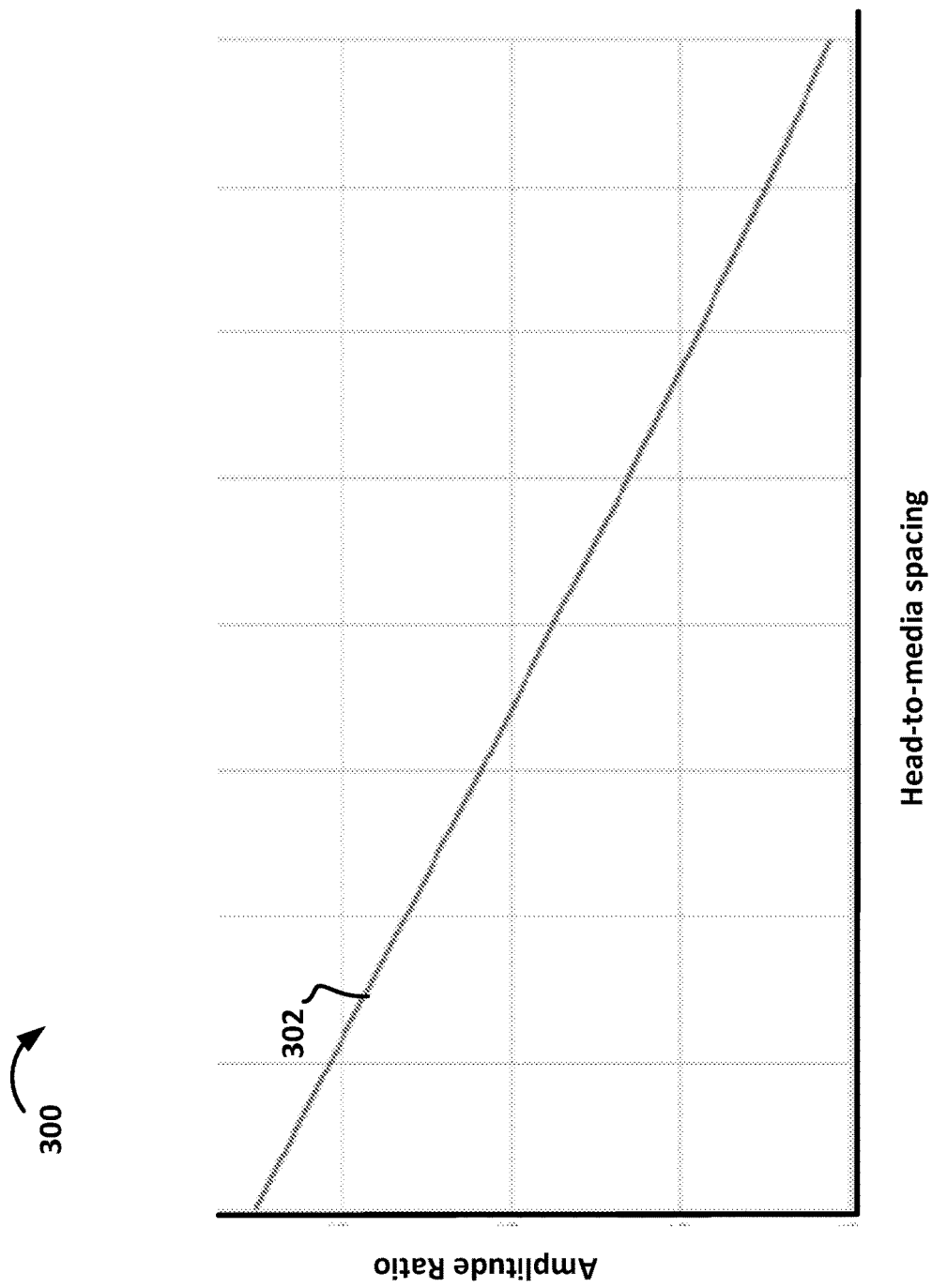
FIG. 5 shows a plot of an amplitude ratio as a function of head-to-media spacing, in accordance with certain embodiments of the present disclosure.

FIG. 5 shows a graph 300 with a plot 302 representing a function (e.g., ratio) of the amplitudes of the first read signal and the second read signal along different head-to-media spacings. Although plot 302 shows a linear relationship between the amplitudes, other functions or relationships (e.g., difference/delta between amplitudes, exponential relationship, curve-fitted relationship) between the signals can be used to measure head-to-media spacing. Using a function such as a ratio of amplitudes from the first reader 126 and the second reader 128 mitigates the effect of noise in the individual read signals. Further, because a ratio is used—rather than overall amplitudes—this approach can be used with different areal densities of magnetic recording media 106. Typically, read signal amplitudes will differ at different areal densities, so a read signal amplitude may be larger for a given spacing at different areal densities.

In certain embodiments, the ratio is based on calculated averages of the read signal generated by the first reader 126 and the read signal generated by the second reader 128. For example, an average of the read signal amplitudes may be calculated over 100 to 1000 bit cycles and then used to calculate the ratio. In other examples, the average amplitude can be calculated over 10,000 or fewer bit cycles.

In certain embodiments, the ratio (or other relationships such as exponential relationships) is based on read signal amplitudes generated by the first reader 126 and the second reader 128 in response to sensing magnetic transitions of sync fields on the magnetic recording media 106. Sync fields are used in hard disc drives for positioning the slider 116 and are stored in servo sectors of the magnetic recording media 106. The sync fields are typically a small portion of full servo sector and may consume less space on the magnetic recording media 106 compared to test patterns required for using the Wallace spacing approach described above.

The plot 302 in FIG. 5 shows one example of how head-to-media spacing can be measured using the read signal amplitudes of the first reader 126 and the second reader 128. In FIG. 5, the ratio of the amplitudes of the first read signal and the second read signal is shown to decrease as the head-to-media spacing increases. That is, the ratio decreases as the slider 116 gets farther away from the magnetic recording media 106. A particular ratio is associated with a particular head-to-media spacing. And, as described above, the amplitudes used to calculate the ratio(s) may be an average of read signal amplitudes measured over time.

The calculated ratio can be used to determine whether the head-to-media should be adjusted. For example, in response to calculating a ratio that is associated with an undesirable head-to-media spacing, a current can be applied to the heating circuit 132 in the slider 116 to induce thermal protrusion so that the air-bearing surface 130 of the slider 116 moves closer to a surface of the magnetic recording media 106. An undesirable head-to-media spacing may be a spacing that is outside a predetermined range of spacings for a given hard disc drive operation. For example, the predetermined acceptable range of spacings may be different for read operations compared to write operations. Regardless, the calculated ratio can be used by the controller 138 to adjust head-to-media spacing of the sliders 116 of the hard disc drive 100.

Figure 6:
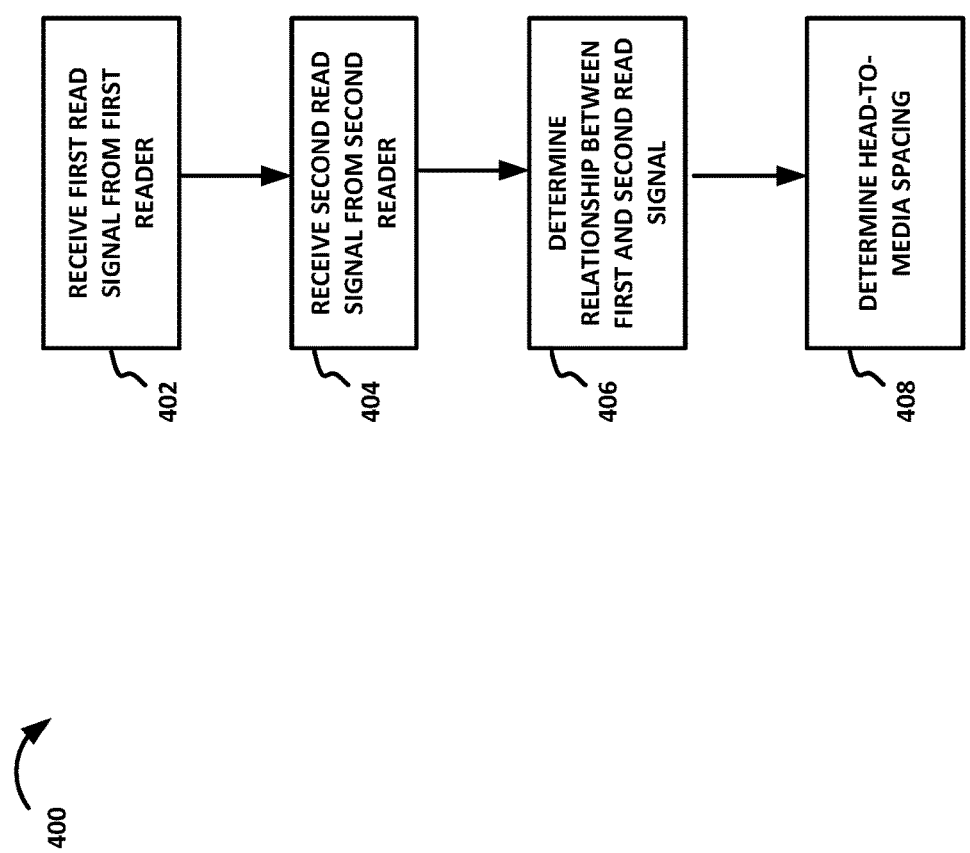
FIG. 6 shows a schematic of steps of measuring head-to-media spacing, in accordance with certain embodiments of the present disclosure.

FIG. 6 shows a schematic of steps of a method 400 for measuring head-media spacing. The method 400 includes receiving a first signal (e.g., read signal) having a first amplitude from the first reader 126 of the slider 116 (step 402). The method also includes receiving a second signal (e.g., read signal) having a second amplitude from the second reader 128 of the slider 116 (step 404). The method 400 includes determining a head-to-media spacing of the slider 116 (step 408), based at least in part on the first amplitude and the second amplitude. In certain embodiments, the determined head-to-media spacing is based on a determined relationship between the amplitudes of the first signal and the second signal (step 406) and head-to-media spacing. For example, the relationship may be in the form of a ratio of the amplitudes of the first signal and the second signal with respect to head-to-media spacing. In certain embodiments, the relationship between the amplitudes and the head-to-media spacing is a linear relationship. As described above, the amplitudes used for determining the relationship may be an average of amplitudes responsive to a set of magnetic transitions recorded to the magnetic recording media 106. The method 400 may also include adjusting the head-to-media spacing in response to the determined head-to-media spacing. For example, the head-to-media spacing may be adjusted by applying or modifying an amount of current applied to the heater circuit 132 in the slider 116 to induce or reduce an amount of thermal protrusion.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disc drive comprising:
a slider including a first reader and a second reader;
a magnetic recording medium; and
a controller configured to determine a distance between the slider and the magnetic recording medium based at least in part on amplitudes of read signals from both the first reader and the second reader.

2. The hard disc drive of claim 1, wherein the controller is configured to determine the distance based at least in part on a function of the amplitudes of the read signals from both the first reader and the second reader.

3. The hard disc drive of claim 2, wherein the controller is configured to determine the function based at least in part on an average of amplitudes of the read signals from both the first reader and the second reader.

4. The hard disc drive of claim 2, wherein the function of the amplitudes of the read signals from both the first reader and the second reader is a ratio.

5. The hard disc drive of claim 1, wherein the controller is configured to determine the distance based at least in part on a difference between the amplitudes of the read signals from both the first reader and the second reader.

6. The hard disc drive of claim 5, wherein the controller is configured to determine the difference based at least in part on an average of amplitudes of the read signals from both the first reader and the second reader.

7. The hard disc drive of claim 1, wherein the controller is configured to cause the distance to change in response to determining the distance between the slider and the magnetic recording medium.

8. The hard disc drive of claim 1, wherein the magnetic recording medium includes sync fields, wherein the controller determines the distance based at least in part on amplitudes generated in response to sensing magnetic transitions of the sync fields.

9. The hard disc drive of claim 1, wherein the first reader and the second reader have different sensitivity functions.

10. The hard disc drive of claim 1, wherein the first reader and the second reader are oriented to sense magnetic transitions that are perpendicular to each other.

11. The hard disc drive of claim 1, wherein the first reader is oriented to sense down-track magnetic transitions, wherein the second reader is oriented to sense cross-track magnetic transitions.

12. The hard disc drive of claim 1, wherein the first reader is a perpendicular reader, wherein the second reader is a cross-track longitudinal reader.

13. The hard disc drive of claim 1, further comprising:
a heater circuit positioned within the slider, wherein the controller is configured to adjust the distance between the slider and the magnetic recording medium based at least in part on the determined distance by adjusting a current applied to the heater circuit.

14. A method comprising:
receiving a first signal having a first amplitude from a first reader of a slider;
receiving a second signal having a second amplitude from a second reader of the slider; and
determining a head-to-media spacing based at least in part on the first amplitude and the second amplitude.

15. The method of claim 14, further comprising:
calculating a ratio of the first amplitude and the second amplitude; and
determining the head-to-media spacing of the slider based at least in part on the calculated ratio.

16. The method of claim 15, wherein the calculated ratio of the amplitudes of the read signals from both the first reader and the second reader as a function of the distance between the slider and the magnetic recording medium is a linear function.

17. The method of claim 15, wherein calculating the ratio is based at least in part on an average of amplitudes of the read signals from both the first reader and the second reader.

18. The method of claim 14, further comprising:
adjusting the head-to-media spacing in response to determining the head-to-media spacing.

19. The method of claim 18, wherein adjusting the head-to-media spacing includes modifying a current applied to a heater.

20. An integrated circuit comprising:
means for determining a ratio between amplitudes of read signals from both a first reader and a second reader; and
means for determining a head-to-media spacing based at least in part on the determined ratio.

* * * * *